United States Patent [19]

Rose

[11] 4,264,632

[45] Apr. 28, 1981

[54] PROCESS FOR PREPARING GROUND MEAT

[76] Inventor: Peter W. Rose, R.R. 3 Covered Bridge Rd., South Barrington, Ill. 60010

[21] Appl. No.: 139,795

[22] Filed: Apr. 14, 1980

Related U.S. Application Data

[63] Continuation-in-part of Ser. No. 129,727, Mar. 12, 1980.

[51] Int. Cl.³ .......................... A23B 4/02; A23L 3/32
[52] U.S. Cl. .................... 426/247; 204/131; 426/244; 426/246; 426/264; 426/282; 426/413; 426/646; 426/652
[58] Field of Search ............... 426/129, 237, 244, 282, 426/284, 641, 646, 649, 652, 413, 518, 519, 246, 247, 264; 204/98, 131

[56] References Cited

U.S. PATENT DOCUMENTS

| | | | |
|---|---|---|---|
| 267,684 | 11/1882 | Fowler | 426/246 |
| 657,258 | 9/1900 | Washburn | 426/246 |
| 705,367 | 7/1902 | Lincoln | 426/246 X |
| 760,173 | 5/1904 | Ball | 426/246 |
| 930,772 | 8/1909 | Lincoln | 426/246 |
| 1,044,201 | 11/1912 | Lincoln | 426/237 |

*Primary Examiner*—Arthur L. Corbin
*Attorney, Agent, or Firm*—Dressler, Goldsmith, Shore, Sutker & Milnamow, Ltd.

[57] ABSTRACT

A process for preparing ground meat by providing a supply of meat chunks, and an aqueous solution of an edible chloride salt; passing a direct electric current through the solution until the resulting solution pH is raised to at least about 8; combining, admixing and agitating the meat chunks and resulting solution while the resulting solution pH is at least about 8 and until the resulting solution is sorbed by said meat chunks; and then grinding said meat chunks.

18 Claims, No Drawings

PROCESS FOR PREPARING GROUND MEAT

CROSS-REFERENCE TO RELATED APPLICATION

This is a continuation-in-part of patent application Ser. No. 129,727, filed on Mar. 12, 1980, by Peter W. Rose and entitled Process For Preparing Ground Meat.

TECHNICAL FIELD

The present invention relates to a process for preparing ground meat and reducing shrinkage therein.

BACKGROUND ART

The largest portion, by weight, of most food animals is composed of water. From about the time an animal is slaughtered, its carcass begins to lose water, dry out and shrink. Shrinkage, which begins on slaughtering, continues through the refrigeration and butchering steps in meat processing, and also during cooking. As a result of such shrinkage, the meat generally becomes somewhat tougher and can be harder to butcher. As a further result of this shrinkage, the meat provider obtains a lesser amount of product to sell, and that product is of diminished quality. Additionally, shrinkage causes the meat purchaser to buy a smaller amount of product to cook, and cooking shrinkage puts a still smaller amount of cooked material on a platter to serve.

Several processes are known in the art which are said to minimize or reverse carcass shrinkage. Among these are those processes in which the carcass is sprayed or fogged with an aqueous solution, or the carcass is dipped into a water bath.

In some anti-shrink techniques in which water is added back to the carcass or its meat to return the water content to a natural level, it is found that such water is usually not held firmly therein and is lost again on processing. For example, it is known and usual in pork sausage manufacture to mix 1,000 pounds of pork chunks with up to 31 pounds of a brine solution containing 30 pounds of water and one pound of salt (sodium chloride). About one minute or more is required for the pork chunks to become moisturized by sorbing the brine. Then, during further processing, when the moisturized pork chunks are ground, shrinkage again is manifest in that some water is lost from the ground, moisturized chunks, lowering the yield of ground meat produced. When sausages containing 60% lean—40% fat ground pork are prepared by this known and usual method, and are cooked with continual rolling at a temperature of about 340°-350° F. for 10 minutes under standard conditions, it is observed that they shrink to about 38–43% of their precooked weight, or maintain about 62–57% of that weight. In addition, air pockets are often noted between the sausage casing and the meat therewithin and the sausages curl.

DESCRIPTION OF THE INVENTION

According to the present invention, a shrink minimizing process for preparing ground meat is disclosed. This process includes the steps of:
  providing a supply of meat chunks;
  providing an aqueous solution containing an edible chloride salt;
  passing a direct electric current through the aqueous solution to form a resulting, electrolyzed solution, the current being passed therethrough at least until the time at which at least about 50 percent by weight of the resulting, electrolyzed solution, when combined with meat chunks at 3 percent by weight of the meat chunks, will be retained after the meat chunk are ground;
  combining the meat chunks and the resulting, electrolyzed solution while at least about 50 percent by weight of the resulting, electrolyzed solution will be retained by the meat chunks after the meat chunks are ground, the resulting, electrolyzed solution being combined with the meat chunks at about 3 percent by weight of the meat chunks;
  agitating the admixture until the resulting, electrolyzed solution is sorbed by the meat chunks to form moisturized meat chunks;
  grinding the moisturized meat chunks to form a ground product; and
  collecting the ground product.

One advantage of the instant process is that when meat is moisturized to a water content similar to that of its natural level, water within the meat tends to become more firmly bound and tends not to be lost during subsequent processing, thereby improving the yield of ground meat by reducing processing shrinkage.

Another advantage of the process of this invention is that when the ground product is cooked, as when it is made into sausages, the yield of cooked sausage made by the process of this invention is greater than is the cooked yield of usually made sausage, thus evidencing a reduction of cooking shrinkage.

Still another advantage of this invention is that the difference in cooked yield between sausages made according to this invention and sausages made in the usual manner may be greater in weight than the weight of water or other ingredients added to the meat during processing.

Another benefit of this invention is that sausages made in accordance with its process are found to be more tender than sausages prepared in the usual manner.

Other advantages and benefits of this invention will be apparent to those skilled in the art.

Best Mode For Carrying Out The Invention

The present invention relates generally to processes for preparing ground meats. As used herein, the word "meat" includes the flesh of mammals, both domesticated and wild, such as beef, veal, pork, mutton, lamb, venison, buffalo and the like.

Pork will be used illustratively herein as it is a meat of great commercial importance, and is exemplary in that both lean and fat cuts are used in preparing ground pork, such as that used in sausages.

The pork used for grinding is frequently prepared from meat trimmings obtained by butchering various cuts of meat. When used in the instant process, a supply of this meat is provided in the form of chunks which are preferably about 1 to about 5 inches on a side. Larger chunks may be also used, such as those pieces up to about 8 inches or more on a side. Additionally, smaller chunks may also be used, such as roughly ground meat like that which has been ground through a grinding face plate having ⅜ inch apertures.

An aqueous solution of an edible chloride salt such as sodium chloride or potassium chloride or calcium chloride is also provided. Sodium chloride is preferred herein and will be used illustratively as the edible chloride salt hereinafter. The edible chloride salt is useful as an ionic medium to support the passage of electricity through the aqueous solution.

A wide range of edible chloride salt concentrations are useful herein and it is found that a concentration of about 0.05% to about 0.4% by weight of the total meat supplied in the process is suitable. An exemplary concentration of sodium chloride present in the aqueous solution useful in this invention is about 0.1% by weight of the total meat supplied in the process.

The amount of edible chloride salt useful herein may also be considered from the viewpoint of the aqueous solution. Thus, an aqueous solution concentration of about 0.2 molal edible chloride salt to about a saturated solution of the edible chloride salt may be used in the present invention. In more preferred practice, the edible chloride salt is present in the aqueous solution at a concentration of about 0.25 to about 0.7 molal. Converting these molalities to percents by weight for sodium chloride, about 1% by weight of aqueous solution to a saturated sodium chloride is useful herein, while use of about 1.5% to about 4% by weight of the aqueous solution is more preferred.

A small amount of a sugar such as sucrose or other flavorant may also be present in the aqueous solution at a concentration sufficient to mask the flavor of the edible chloride salt. A useful amount of sucrose for this purpose has been found to be about 0.01% by weight of the total meat supplied.

A direct current of electricity is passed through the aqueous sodium chloride solution to form a resulting, electrolyzed solution. The aqueous sodium chloride solution is electrolyzed at least until the time at which at least about 50 percent by weight of the resulting, electrolyzed solution, when combined with the meat chunks at about 3 percent by weight of those meat chunks, will be retained after those meat chunks are ground. In more preferred practice, passage of current through the solution is continued until about 60% to about 80% by weight, and most preferably greater than about 80% by weight of the combined, resulting, electrolyzed solution, when combined with the meat chunks at about 3% by weight of the meat chunks, will be retained after the meat chunks are ground.

Aqueous sodium chloride (edible chloride salt) solutions useful in the preparation of ground meat products may also contain a variety of ingredients including buffering agents such as various carbonate and phosphate salts, like sodium bicarbonate, sodium hexametaphosphate and sodium pyrophosphate. When buffering agents are present, the hereinabove described functional description of the duration of electrolysis is most useful for determining the duration of the current passage. However, when there is in essence no buffering capacity in the aqueous sodium chloride solution, as in a tap water-sodium chloride solution, the direct electric current may be passed through the aqueous sodium chloride solution until the pH of the resulting, electrolyzed solution has at least a value of about 8. In more preferred practice, passage of the direct current (electrolysis) is continued until a resulting, electrolyzed aqueous sodium chloride solution pH value of about 8.5 to about 10.5 is achieved.

The aqueous solution of sodium chloride normally has a near neutral pH value. For example, the aqueous sodium chloride solution may have a pH value, using city of Chicago tap water, of about 6.5 to about 7.7, prior to the passage of current therethrough.

It is noted that the rise in pH value is only temporary. For a solution containing about 3.8% by weight sodium chloride (0.1% by weight of the total meat supplied), the pH value begins to fall back towards its original value about 15 minutes after the electrolyzing, direct electric current is shut off. This solution reverts to about its original pH value after about 40 minutes from the time the direct current is shut off.

The resulting, electrolyzed sodium chloride (edible chloride salt) solution is preferably combined with the meat chunks while the pH value of the solution is at least about 8. More preferably, the resulting, electrolyzed sodium chloride solution is combined with the meat chunks while its pH value is about 8.5 to about 10.5.

For compositions having greater buffering capacity, it is preferred that the resulting, electrolyzed solution be combined with the meat chunks while at least about 50% by weight of the resulting, electrolyzed solution, when combined with the meat chunks at about 3% by weight of the meat chunks, will be retained after the meat chunks are ground. More preferably, the resulting, electrolyzed solution is combined with the meat chunks while about 60% to about 80% by weight, and most preferably more than about 80% by weight of the combined, resulting, electrolyzed solution will, when combined with the meat chunks at about 3% by weight of the meat chunks, will be retained after the meat chunks are ground.

The amperage of the direct electric current passed through the aqueous solution of sodium chloride is preferably about 7 to about 13 amperes, and more preferably about 8 to about 12 amperes, while the voltage may bes about 10 to about 20 volts, and more preferably about 12 to about 18 volts. It is found that voltage values measured for similar solutions to produce a given change in pH value tends to vary, while the amperage values to produce the pH value change for these same solutions is relatively constant.

Electrodes for use in the present process may be selected from a wide variety of materials such as carbon (graphite), silver, or stainless steel, or the like, as is known in the art. In one suitable arrangement, a stainless steel pan containing the sodium chloride solution may be used as the anode while a carbon electrode suspended within the solution in the pan may be the cathode; the pan may alternatively be made the cathode and the carbon electrode the anode.

It has been found preferable that the resulting, electrolyzed sodium chloride solution whose pH value has been raised to at least about 8 be at a temperature of about 100° F. to about 130° F., and more preferably at about 110° F., after passage therethrough of the direct electric current and when it is combined with the meat chunks, as discussed hereinbelow. Since the addition of this heated solution tends to raise the temperature of the otherwise chilled meat chunks, communited ice may also be admixed with the meat chunks and resulting sodium chloride solution to assist in keeping the meat chunks chilled. The ice and sodium chloride solution are together referred to herein as the aqueous portion. Various means of heating water are well known in the art, and hot tap water may be used.

When carrying out the process of this invention for ground meat which is to be sold to the public, it is of import that United States Department of Agriculture or other standards be followed as to the amount of water, salts and other ingredients which may be added to and utilized with ground meat products. The amounts of various additives described and utilized herein are used only in an illustrative manner to assist in demonstrating the several benefits of this invention and are not intended to indicate approval of their use by any agency of the United States of America or any other sovereign.

The meat chunks, resulting, electrolyzed solution of tap water and sodium chloride whose pH value has been raised to a value of at least about 8 and ice particles (when used) are combined together to form an admixture. A conventional mixing means such as a paddle mixer or ribbon mixer or the like as are known in the industry may be used. The admixture is agitated until the solution is sorbed by the meat chunks to form moisturized meat chunks. For example, this sorption takes less than about 1 minute and frequently less than ½ minute of agitation time for an aqueous solution containing 3% water and 0.1% sodium chloride, both based on the total weight of meat supplied.

The word "sorb" as used herein in its various grammatical forms is meant to include both the terms absorb and adsorb.

It is preferred, when making ground meats having a high fat content, such as the common 60% lean —40% fat port sausage, to first combine and agitate leaner meat chunks, such as those containing no more than about 8% to about 10% fat by weight and portion to form moisturized meat chunks. Once the aqueous portion has been sorbed, a second supply of meat chunks having a higher fat content by weight may be admixed with the moisturized meat chunks to form a second meat chunk admixture.

After all of the meat and resulting aqueous solution have been admixed, the composition, whether moisturized meat chunks or second meat chunk admixture, is ground to form a product. It is found when the process of this invention is followed in the production of 60% lean—40% fat pork sausages, that little or no water is lost during the grinding step, thus demonstrating shrinkage reduction during processing. This finding is contrary to the usual findings when this type of sausage is made with the same amount of moisturizing water and sodium chloride per pound of meat, and was quite startling when first observed. The exact reason that use of the process of this invention results in an apparently tighter binding of water to the meat, and less processing shrinkage is unknown.

After grinding, the ground product is collected. If sausages are made, the ground meat is stuffed into sausage casings, such as those made from processed collagen, and the stuffed casings are bound or knotted to form sausage links or large sausages, as is known in the art.

Ground product used in sausages also usually contains added spices. In preferred practice herein, spices are added to the meat prior to the grinding step as this helps assure a uniform distribution of the spices.

EXAMPLE 1: Pork Sausage Links

To demonstrate the process of this invention, 60% lean-40% fat pork sausages were prepared in two batches using equal amounts of total meat, water, sodium chloride, sugar and spice. For one batch of sausages, the usual process was followed, while for the other batch, the process of this invention was used.

Thus, a solution of 25 pounds of water containing an additional 1 pound of sodium chloride and 72 g of sucrose was provided in a stainless steel pan. The pan was used as the anode and a carbon electrode was used as the cathode for passage of a direct electric current at 10 amperes and 15 volts. This current passage raised the pH value of the resulting, electrolyzed solution from about 6.5 to about 9 in about 5 minutes.

The resulting solution, at a temperature of about 110° F., was then combined with 120 pounds of super lean pork (9% fat by weight) chunks and 5 pounds of ice particles. This aqueous portion of ice and aqueous solution was sorbed within about 10 seconds of the beginning of the agitation to form moisturized lean pork chunks. 880 pounds of less lean pork chunks (having a higher fat content) were supplied and admixed with the moisturized lean pork chunks to form a second pork chunk admixture which was 60% lean and 40% fat.

Usual sausage spices were then added to this second pork chunk admixture to form a spiced pork admixture. Grinding of this spiced pork admixture under usual conditions formed a ground, spiced pork product and produced no water run-off from the meat. The ground spiced pork product was placed in collagen sausage casings and the casings bound as usual to form sausage links, with each link weighing about one ounce.

The thus prepared sausage links were cooked for 10 minutes at 340°-350° F. with continual rolling of the individual sausage links. The cooked yield weighed about 68% of the uncooked sausage weight. The cooked sausages were straight, showed little if any curvature and air pockets between the casing and meat were not evident.

Ground, spiced pork prepared in the usual manner with the same amount of meat, total water, sodium chloride, sugar and spices yielded about 3% less product after grinding, due primarily to water loss. Sausages prepared from this ground pork averaged a cooked yield of about 62-57% of the uncooked sausage weight, were bent after cooking and showed air pockets between the casing and meat.

Thus, the process of this invention produced two increases in yield. First, more salable product was produced per pound of starting materials. Second, more edible product was produced after cooking. It is noted that the difference in cooking shrinkage (about 6% to about 11%) between sausages prepared in both manners represents a greater weight differential than that due to the weight of aqueous solution used during processing.

It is also found that sausages prepared from ground pork of this invention are more tender than sausages made with usually prepared ground pork. This effect is noted during normal taste and chewing tests carried out on the products, and by breaking the sausages between the fingers and observing how the sausages snap.

Example 2: Pre-cooked Pork Sausage

In another experiment, a pork sausage cooked prior to its sale (pre-cooked) was produced. Here, 1000 pounds (120 pounds and 880 pounds) of 60% lean—40% fat pork chunks were treated in a manner analogous to the meat of Example 1, except that 110 pounds of water and about 4.2 pounds of salt were used. After grinding, approximately 1110 pounds of ground meat were obtained.

Four thousand pounds of this ground meat were placed into 3.25 inch diameter sausage casings, bound, placed in a smoke house and cooked for four hours at 170° F. after which time an internal temperature of 150° F. was achieved, as is the usual practice. After cooking and cooking to ambient temperature, 3840 pounds (96% yield) of pre-cooked, pork sausage was obtained.

When using the usual techniques, moisture added to avoid processing shrinkage is mostly lost during processing so that 1000 pounds of meat chunks yields about 1000 pounds of ground meat. When a 4000 pound batch of this usual ground meat is made into pre-cooked pork sausages as described hereinabove, the cooled product usually shrinks to a weight of about 3000 pounds.

In addition, the diameter of the pre-cooked products differ, with the pre-cooked sausage of this invention remaining essentially unchanged in diameter while the sausage prepared in the usual manner has its diameter diminished by about 15–25% after the pre-cooking step.

EXAMPLE 3: Ground Beef Patties

Ground beef patties were prepared from about 5 pounds of chuck blade pot roast which was cut into chunks about 2 inches along the largest dimension. These chunks were then rough ground by passing them through a grinder having ⅜ inch plate openings to form small beef chunks.

An aqueous solution containing 1 pound of salt, 72 grams of sucrose and 25 pounds of water was prepared and had a pH value of 7.8. This solution was divided into two approximately equal portions. One portion was electrolyzed by the passage through it of a direct current of 5 amperes for 5 minutes to yield a resulting, electrolyzed solution having a pH value of 8.4. The other portion was left as it was as the control solution.

The rough ground, small chunks of beef were also divided into two approximately equal portions. One portion was combined with the resulting, electrolyzed aqueous solution during the time that the pH value of the solution was 8.4, and the other portion was combined with the control solution to thereby form two admixtures. In both cases, the aqueous solutions was 20 percent by weight of the total admixture weight. The admixtures were agitated until the aqueous solutions were sorbed, to form two batches of moisturized meat chunks.

Each batch of the moisturized meat chunks was then separately ground using a grinding plate having ⅛ inch apertures. The ground beef thus produced was placed in a refrigerator overnight. The next day, this ground product was made into patties, three from each batch, and the total weight of all of the patties from each batch was determined.

All six patties were cooked together in an electric frying pan at 325° F. for 15 minutes with no additives, such as grease or fat, in the pan. After cooking, the cooked patties were allowed to drain, and were weighed again and the cooked yield and shrink for the patties made by each process were determined.

It was found that the cooked beef patties made in accordance with this invention had a cooked yield of 63.6% or a cooking shrink of 36.4%, while the cooled control beef patties had a cooked yield of 60.1% or a cooking shrink of 39.9%. Thus, beef patties made in accordance with this invention demonstrated about 9% less cooking shrink than did the control beef patties.

What is claimed is:

1. A process for preparing ground meat comprising the steps of:
    providing a first supply of meat chunks;
    providing an aqueous solution containing an edible chloride salt;
    passing a direct electric current through said aqueous solution for a time sufficient to raise the pH value of the resulting, electrolyzed solution to at least about 8;
    combining said meat chunks and said resulting, electrolyzed solution to form an admixture while the pH value of said resulting aqueous solution is at least about 8;
    agitating said admixture until said resulting aqueous solution is sorbed by said meat chunks to form moisturized meat chunks;
    grinding said moisturized meat chunks to form a ground product; and
    collecting said ground product.

2. The process of claim 1 wherein said edible chloride salt is sodium chloride, and is present at a concentration of about 0.1 percent by weight of the total weight of meat supplied.

3. The process of claim 1 wherein said edible chloride salt is present in said aqueous solution at a concentration of about 0.2 molal to a saturated solution.

4. The process of claim 1 wherein said edible chloride salt is present in said aqueous solution at a concentration of about 0.25 to about 0.7 molal.

5. The process of claim 1 wherein said edible chloride salt is sodium chloride.

6. The process of claim 1 wherein said direct electric current is passed through said aqueous solution at about 7 to about 13 amperes.

7. The process of claim 1 additionally comprising the steps of supplying and admixture additional meat chunks with said moisturized meat chunks prior to said grinding step to form a second meat chunk admixture.

8. The process of claim 7 wherein said additionally admixed meat chunks contain more fat than said first supply of meat chunks.

9. The process of claim 1 wherein said direct current is passed through said aqueous solution until the pH value of the resulting aqueous solution is about 8.5 to about 10.5.

10. A process for preparing ground meat comprising the steps of:
    providing a first supply of meat chunks;
    providing an aqueous solution containing sodium chloride present in said solution at a concentration of about 0.2 molal to a saturated solution;
    passing a direct electric current at about 7 to about 13 amperes through said solution for a time sufficient to raise the pH of the resulting, electrolyzed solution to a value of about 8.5 to about 10.5;
    combining said meat chunks and said resulting, electrolyzed solution to form an admixture while the pH value of said resulting aqueous solution is about 8.5 to about 10.5;
    agitating said admixture until said resulting aqueous solution is sorbed by said meat chunks to form moisturized meat chunks;
    providing a second supply of meat chunks containing a higher fat content than said first meat chunk supply;
    admixing said second supply of meat chunks with said moisturized meat chunks to form a second meat chunk admixture,
    grinding said second meat addixture to form a ground product; and
    collecting said ground product.

11. The process of claim 10 wherein said resulting, electrolyzed solution is combined with said meat chunks at a temperature of about 100° F. to about 130° F.

12. The process of claim 10 wherein said direct electric current is passed through said solution at about 8 to about 12 amperes.

13. The process of claim 10 wherein said meat chunks are pork.

14. The process of claim 10 wherein said meat chunks are beef.

15. The process of claim 10 comprising the additional steps of adding spices prior to said grinding step, and stuffing said ground product into sausage casings and binding said stuffed casings to form sausages.

16. The process of claim 15 wherein said sausage is pre-cooked.

17. A process for preparing pork sausages comprising the steps of:

providing a supply of lean pork chunks;

providing an aqueous solution containing sodium chloride present at about 0.1 percent by weight of the total pork supplied;

passing a direct electric current at about 12 to about 18 volts and about 8 to about 12 amperes through said solution for a time sufficient to raise the pH of the resulting, electrolyzed solution to a value of about 8.5 to about 10.5;

combining said lean pork chunks and said resulting, electrolyzed solution to form an admixture while said resulting aqueous solution has a pH value of about 8.5 to about 10.5 and a temperature of about 100° F. to about 130° F.;

agitating said admixture until said resulting aqueous solution is sorbed by said lean pork chunks to form moisturized lean pork chunks;

providing a second supply of pork chunks containing a higher fat content than said supply of lean pork chunks;

admixing said second supply of pork chunks with said moisturized lean pork chunks to form a second pork chunk admixture;

admixing spices with said second pork chunk admixture to form a spiced pork admixture;

grinding said spiced pork admixture to form a ground, spiced pork product; and stuffing said ground, spiced pork product into sausage casings and binding said stuffed casings to form sausages.

18. The process of claim 17 wherein said sausage is pre-cooked.

* * * * *

UNITED STATES PATENT OFFICE
CERTIFICATE OF CORRECTION

Patent No. 4,264,632　　　　　　　Dated April 28, 1981

Inventor(s) Peter W. Rose

It is certified that error appears in the above-identified patent and that said Letters Patent are hereby corrected as shown below:

Column 2, line 4, "chunk" should be --chunks--.

Column 5, line 27, the phrase --termed in the art as super lean, with the aqueous-- should be added after the words "weight and" and before the words "portion to form."

Column 8, line 31, "admixture" should be --admixing--.

Signed and Sealed this

Seventeenth Day of August 1982

[SEAL]

Attest:

GERALD J. MOSSINGHOFF

Attesting Officer　　Commissioner of Patents and Trademarks